United States Patent Office 2,890,039
Patented June 9, 1959

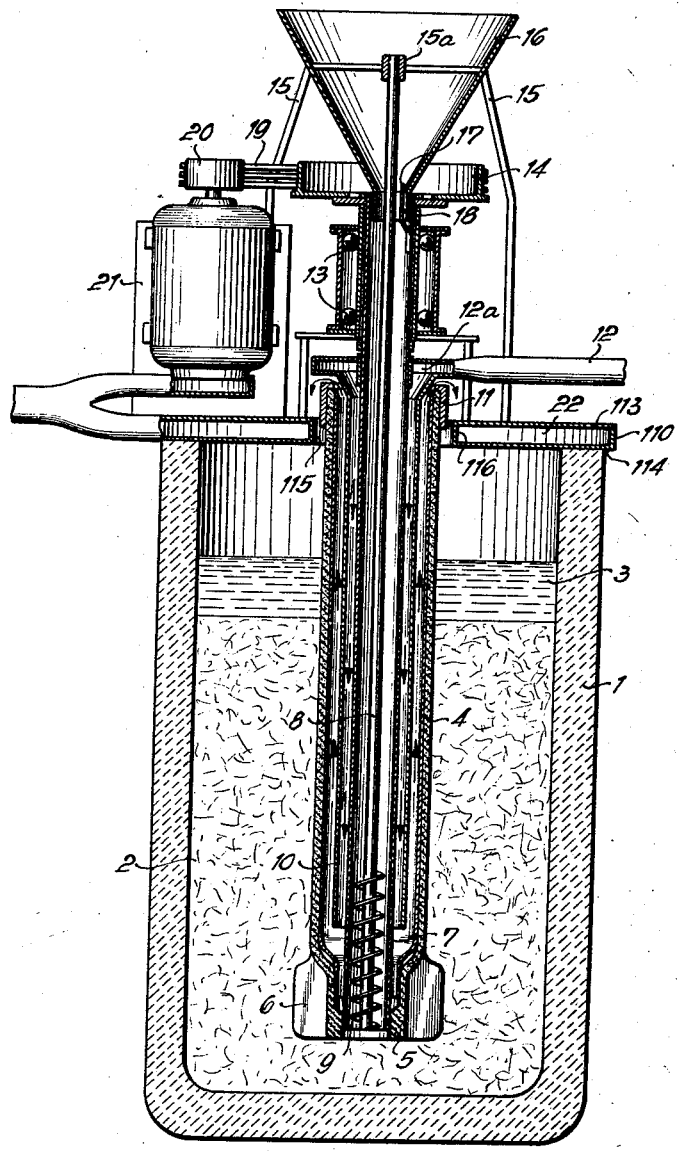

2,890,039

APPARATUS FOR THE INTRODUCTION OF SUBSTANCES INTO LIQUIDS OF HIGH SPECIFIC GRAVITY

Werner Schmidt, Stuttgart-Vaihingen, Germany, assignor to Karl Schmidt Metallschmelzwerk G.m.b.H., Stuttgart-Vaihingen, Germany, a firm Application November 1, 1954, Serial No. 465,909

Claims priority, application Germany November 2, 1953

4 Claims. (Cl. 266—34)

This invention relates to apparatus for the continuous introduction of substances into liquids of high specific gravity. The substances to be introduced may be of ultrafine grain size or in powder form, or they may be granular, coarse-grained or in the form of pellets or tablets.

An object of the invention is to provide an improved apparatus for the continuous introduction of and distribution of substances into liquids having a high specific gravity.

Another object of the invention is to provide apparatus for the introduction of and distribution of a substance into a bath of molten metal.

A further object of the invention is to insure a fine distribution of the substance within the liquid in which the substance is to be immersed.

According to the present invention there are provided means for the introduction of a substance into a liquid of higher specific gravity wherein the substance is introduced as a stream flowing into the liquid against the hydrostatic pressure thereof, and means to promote the flow of the said stream beyond the natural pressure head thereof.

Thus, in accordance with the invention, a constant flow of the substance to be introduced is maintained, this flow extending below the surface of the liquid, while at least the natural pressure head of the stream is utilised for the conveyance of the stream.

The process of the invention may be employed to prepare aluminium-silicon alloys and a salt similar to chiolite, for which purpose sodium silico-fluoride is introduced into chemically pure aluminium. In this process, for example, the problem exists of introducing a substance having a specific gravity 2.7 into a bath of molten metal having a specific gravity 2.4.

For a better understanding of the invention and to show how the same may be carried into effect, reference will now be made to the accompanying drawing in which the sole figure is a longitudinal section of one embodiment of the invention.

In the embodiment illustrated, a container 1 of any desired form is provided, which contains a bath of molten metal 2 and a salt melt 3.

Preferably, the container 1 is internally lined with carbon or electrographite in order, on the one hand to prevent the metal from alloying with the container, and on the other hand to prevent impurities from entering into the mixture.

An outer tube 4 extends vertically into the container 1. The tube 4 is tapered at its lower end 5 and has agitating blades 6 fixedly attached thereto. Two or more agitating blades may be provided.

The tube 4 consists preferably of carbon or electrographite which is insensitive to the attack of the molten metal to be treated. Extending into the tube 4 is an inner tube 7 which in turn contains a rod 8 carrying on its lower end a feed worm 9. The feed worm 9 extends almost to the bottom end of the tube 4 and its lower end is level with that of the inner tube 7. The inner tube 7 is mounted on the lower end of the tube 4 without clearance, while the feed worm 9 is freely suspended in the inner tube 7.

Provided between the inner tube 7 and the tube 4 is a further or intermediate tube 10, which is spaced from the outer tube 4 and from the inner tube 7. The tube 10 does not extend to the lower end of the inner tube 7.

The outer tube 4 and the tube 10 are connected to the inner tube 7 by securing means 11 in the form of a perforated cap.

Cooling air penetrates through the feed tube 12 and the annular nozzle 12a fixedly connected thereto, by way of the holes in the cap 11, into the clearance between the inner tube 7 and the tube 10. This coolant circulates as indicated by the arrows and then escapes upwardly. While the tube 4 terminates in the cap 11, the inner tube 7 is extended upwardly and is supported in ball-bearing 13. Provided at the upper end of the inner tube 7 is a pulley 14, which is fashioned in cup form.

The rod 8 is extended upwardly and held fast at the point 15a by a support 15. While the inner tube and consequently the outer tube can be rotated by the pulley 14, the feed worm 9 and the rod 8 remain immovable; that is to say, they do not rotate.

Freely extending into the inner tube 7 is a hopper 16, which is so arranged that it remains immovable in the same way as the rod 8. The hopper is, in fact, held by the linkage 15.

Extending into the hopper 16 from the rotatable inner tube 7 is a mandrel or finger 17, which serves to enable the substance in the hopper to move uniformly downwards to the feed worm. If, for example, a stoppage of the introduced substance (for example, sodium silicofluoride) occurs at the neck 18 of the hopper, the mandrel 17 serves to remove this stoppage.

The pulley 14 is connected by a belt 19 to a pulley 20 of a driving motor, which is preferably an electric motor and is mounted on a plate 21 disposed parallel to the feed arrangement. The upper closure of the container consists of a cover plate having a cooling jacket 22.

As already mentioned, the tube 4 preferably consists of graphite or the like. Provided in the said tube for protection against oxidation by the cooling air is a jacket 23, for example of non-scaling or non-oxidizing steel, which bears tightly against the said tube.

What is claimed is:

1. Apparatus for disbursing a substance into a fluid medium having a higher specific gravity comprising: a container housing the medium, inner and outer tubes concentrically disposed in vertical alignment in the container, agitating paddles on the outer tube at the lower extremity thereof, the outer tube being connected to the inner tube, the inner tube including an upper portion extending upwardly out of the outer tube and container, a rod in the inner tube and extending upwardly out of the same, a feed worm on the rod in the lowermost portion of the inner tube, an intermediate tube between the inner and outer tubes and spaced from the connection of the latter, the tubes thus defining downwardly and upwardly directed connected passages for the flow of a coolant, rotating means engaging and supporting the inner tube above the container for rotating the same and thereby the outer and intermediate tube and paddles, and a hopper extending freely and downwardly into the inner tube for feeding said substance thereto, the rod extending into the hopper, means supporting the hopper and rod and preventing the same from rotating with the tubes.

2. Apparatus as claimed in claim 1 wherein the outer tube and paddles are of a material chemically resistant to molten aluminum.

3. Apparatus as claimed in claim 1 wherein the lowermost portion of the outer tube converges toward the inner tube for connection therewith.

4. Apparatus as claimed in claim 1 wherein the outer tube extends below the inner tube.

References Cited in the file of this patent

UNITED STATES PATENTS

| | | |
|---|---|---|
| 966,501 | Wenk | Aug. 9, 1910 |
| 1,073,587 | Billings | Sept. 23, 1913 |
| 1,751,008 | La France | Mar. 18, 1930 |
| 2,114,547 | Sollinger | Apr. 19, 1938 |
| 2,298,317 | Smith | Oct. 13, 1942 |
| 2,435,039 | Harper | Jan. 27, 1948 |
| 2,525,973 | Sundstrom et al. | Oct. 17, 1950 |
| 2,546,937 | Wyandt et al. | Mar. 27, 1951 |
| 2,681,798 | Muller | June 22, 1954 |
| 2,692,196 | Hulme | Oct. 19, 1954 |

FOREIGN PATENTS

| | | |
|---|---|---|
| 232,028 | Great Britain | Apr. 16, 1925 |

OTHER REFERENCES

The Iron Age, November 2, 1939, page 55.